United States Patent [19]

Miller et al.

[11] Patent Number: 4,611,157
[45] Date of Patent: Sep. 9, 1986

[54] SWITCHED RELUCTANCE MOTOR DRIVE OPERATING WITHOUT A SHAFT POSITION SENSOR

[75] Inventors: Timothy J. E. Miller, Schenectady, N.Y.; James T. Bass, College Station, Tex.

[73] Assignee: General Electric Company, Schenectady, N.Y.

[21] Appl. No.: 699,537

[22] Filed: Feb. 8, 1985

[51] Int. Cl.⁴ .............................................. H02P 8/00
[52] U.S. Cl. .................................... 318/696; 318/685; 318/138
[58] Field of Search ...................... 318/696, 685, 138; 368/157

[56] References Cited

U.S. PATENT DOCUMENTS

| Re. 31,229 | 5/1983 | King | 318/696 |
|---|---|---|---|
| 3,697,840 | 10/1972 | Koch | 318/138 |
| 3,980,933 | 9/1976 | Piatkowsky, Jr. | 318/138 |
| 4,326,278 | 4/1982 | Shida et al. | 368/157 |
| 4,477,757 | 10/1984 | Palombo et al. | 318/696 |
| 4,500,824 | 2/1985 | Miller | 318/701 |
| 4,520,302 | 5/1985 | Hill et al. | 318/696 |

OTHER PUBLICATIONS

Sales literature on the Oulton ® Switched Reluctance Drive, from Tasc Drives Ltd.
Bakhuizen, "On Self-Synchronisation of Stepping Motors", Eindhoven University of Technology.
Kuo et al., "On Current Detection in Variable-Reluctance Step Motors", Proc. 6th Ann. Symp. on Incre. Mo. Cont., 5/77, pp. 205-220.
Taft et al., "Development of No Overshoot Open-Loop Step Motor Control Strategies Using Velocity-Error Plane", U. of N. Hampshire.
Frus et al., "Closed-Loop Control of Step Motors Using Waveform Detection", Proc. Int. Conf. St. Motors, 7/76, pp. 44-53.
Davis et al., "Inverter Drive for SR Motor: Circuits and Component Ratings", IEEE Proc., 3/81.
Acarnley, Stepping Motors: A Guide to Modern Theory and Practice, IEE Control Eng. Series, Peregrinus Ltd., New York, pp. 113-125.
M. L. Patterson, "Analysis and Correction of Torque Harmonics in Permanent-Magnet Step Motors", Proc. 6th Ann. Symp. on Increm. Mot. Contr., 5/77, pp. 25-38.

Primary Examiner—William M. Shoop, Jr.
Assistant Examiner—Saul M. Bergmann
Attorney, Agent, or Firm—Mark L. Mollon; James C. Davis, Jr.; Marvin Snyder

[57] ABSTRACT

A method and apparatus for operating a switched reluctance motor at high efficiency, without requiring a shaft position sensor, allows dynamic increase of the torque margin as the dwell angle of the phase currents is changed in response to a change in load torque. Average current supplied by the DC link is sensed as a measure of load torque and is used to control the dwell angle.

13 Claims, 9 Drawing Figures

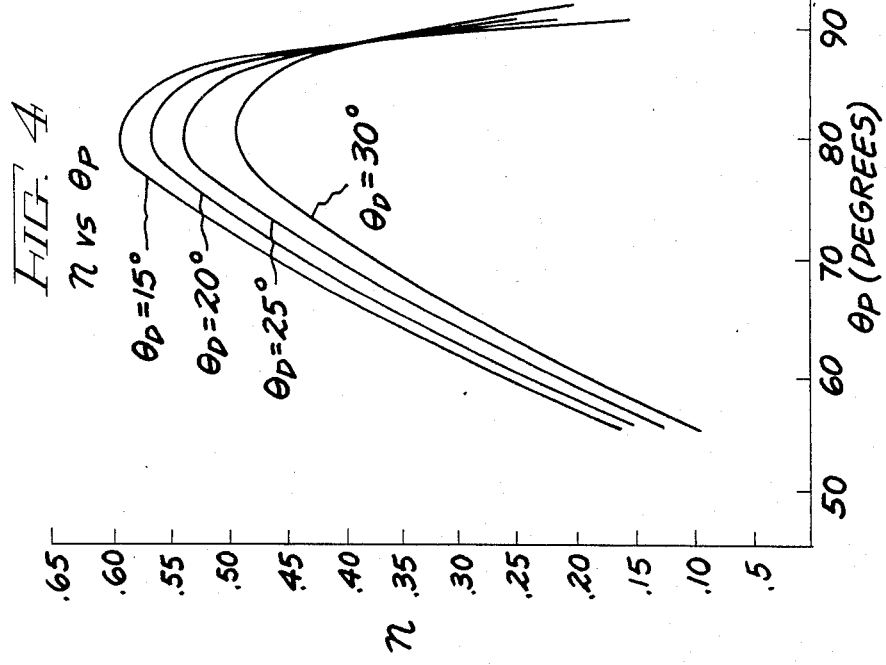
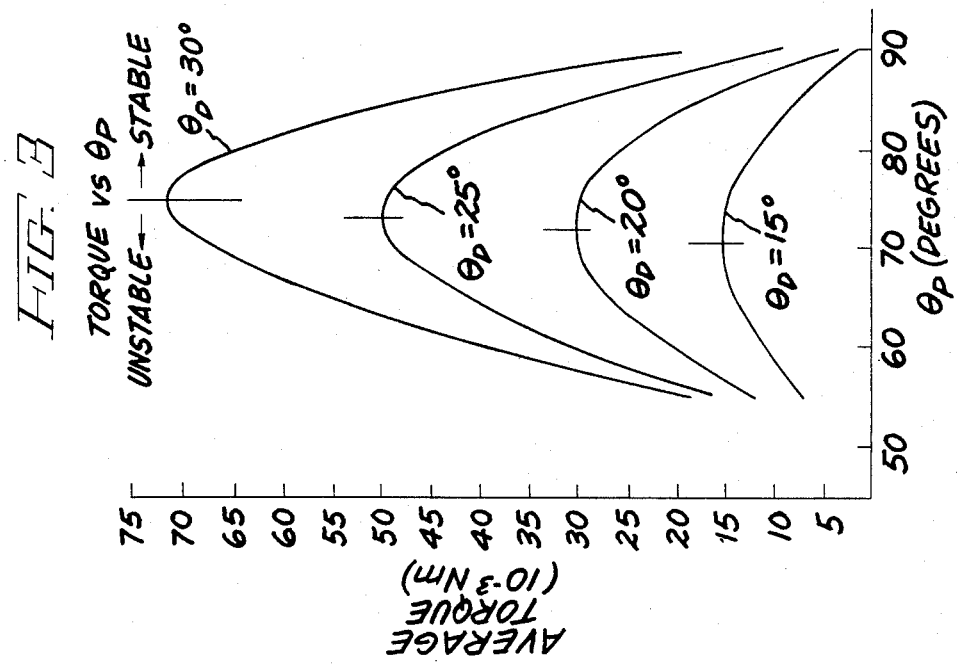

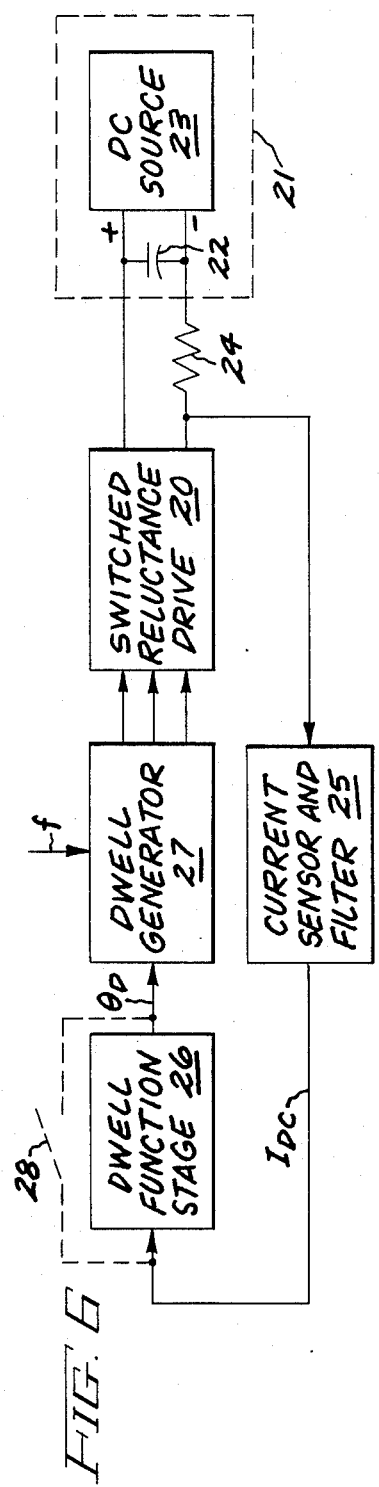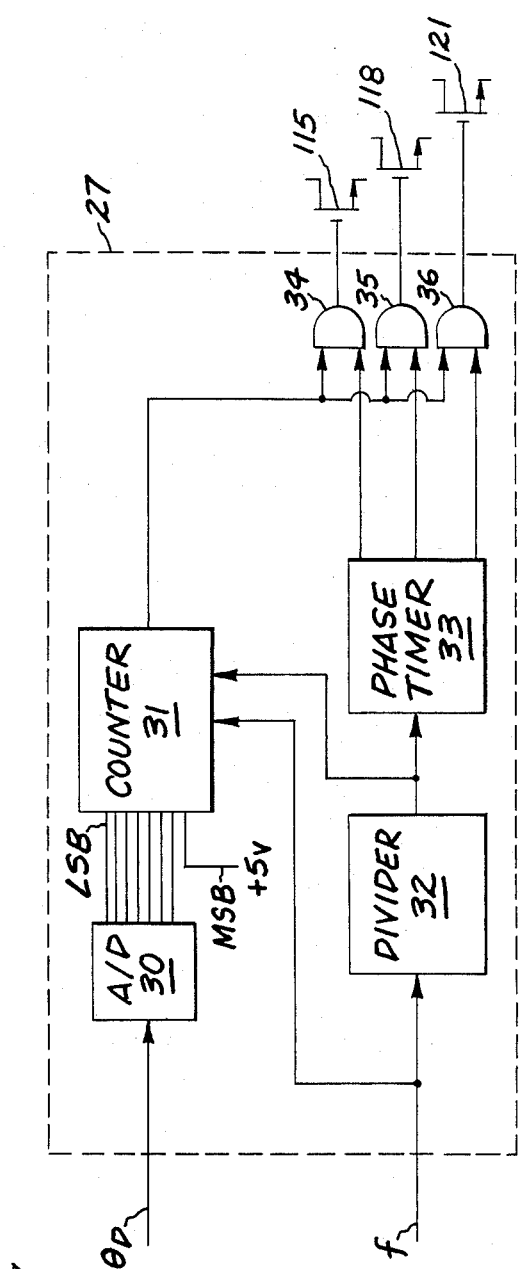
FIG. 6
FIG. 7

4,611,157

SWITCHED RELUCTANCE MOTOR DRIVE OPERATING WITHOUT A SHAFT POSITION SENSOR

The present invention relates in general to a method of controlling a converter for a variable reluctance drive operating without a shaft position sensor and more specifically to setting the dwell angle of the phase current supplied by the converter so that the drive is operated near its pullout torque and at maximum efficiency.

BACKGROUND OF THE INVENTION

Variable reluctance or switched reluctance motors conventionally have poles or teeth on both the stator and the rotor (i.e. they are doubly salient). There are windings on the stator but no windings on the rotor. Each pair of diametrically opposite stator windings is connected in series to form one phase of the switched reluctance motor.

Torque is produced by switching current on in each phase in a predetermined sequence so that a magnetic force of attraction results between the rotor and stator poles that are approaching each other. The current is switched off in each pair of windings at the commutation point before the rotor poles nearest the stator poles of that pair of windings rotate past the aligned position, otherwise the magnetic force of attraction will produce a negative or braking torque.

The torque developed is independent of current direction. Therefore, unidirectional current pulses synchronized with rotor movement can be generated in a converter using a single unidirectional current switching element such as a thyristor or transistor in each leg of the converter, and supplied to the corresponding phase of the motor.

Each time a phase of the switched reluctance motor is switched on by closing a switch in a converter, current flows in the pair of stator windings, providing energy from a DC supply to the motor. The energy drawn from the supply is converted partly into mechanical energy, by causing the rotor to rotate towards a minimum reluctance configuration, and partly into a magnetic field. When the switch is opened, part of the stored magnetic energy is converted to mechanical output and the remainder of the energy is preferably returned to the DC source.

The converter must switch the phase currents on and off in precise synchronism with the rotor position. This "shaft-position switching" is normally accomplished using a shaft position sensor by referencing the switching of the transistors in each converter leg to a set of pulses derived from the shaft position sensor. One example of a shaft position sensor is a fixed light source and a fixed light detector on opposite sides of a slotted disc connected to the shaft which optically interrupts the light beam between the source and the detector in accordance with the position of the shaft. The shaft position sensor is undesirable in small motors because of its cost, and in both large and small motors because of its space requirement and the vulnerability of the signal wires that must run between the motor and the electronic power converter.

It is known to run variable reluctance stepping motors without a shaft position sensor and without loss of steps by a method wherein very wide current pulses are provided by the converter without reference to the rotor position. The stepping motor thus operates at a very high torque margin so that torque transients do not cause a loss of steps. While the method described for operating stepping motors has high stability, the high torque margin is obtained at the expense of efficiency.

OBJECTS OF THE INVENTION

It is a principal object of the present invention to provide a new and improved method for controlling a switched reluctance drive without a shaft position sensor at a high efficiency.

It is a further object of the present invention to provide a method for operating a variable reluctance drive near its pullout torque for all normal values of instantaneous load torque.

It is another object of the present invention to provide a new and improved apparatus for controlling the converter of a switched reluctance drive which operates without a shaft position sensor, and which operates the switched reluctance drive at maximum efficiency.

It is yet another object of the present invention to provided an apparatus for operating a switched reluctance drive near its pullout torque.

SUMMARY OF THE INVENTION

These and other objects are achieved by an open loop method for controlling a converter in a variable reluctance drive, comprising the steps of measuring load torque and setting the dwell angle of the phase current in the converter, whereby an increase in measured load torque increases the dwell angle and whereby a decrease in measured load torque decreases the dwell angle. The dwell angle is chosen in response to the measured load torque such that the commutation angle of the phase current is fixed at a value which results in maximum efficiency in the switched reluctance drive. The method may further include the step of changing the frequency at which the converter operates in response to the change in measured load torque.

Apparatus for controlling the converter includes current sensing and filtering means for providing a current signal proportional to the DC component of the current supplied by a DC link, the current signal representing measured load torque, and a dwell generator coupled to the current sensing and filtering means and responsive to an input frequency signal. The dwell generator provides firing pulses to the converter, the firing pulses having a dwell angle determined by the dwell generator in accordance with the current signal. The apparatus may also include dwell function means for generating a dwell signal in response to the current signal, the dwell signal being selected to fix the commutation angle of the phase current at the value which provides maximum efficiency in the drive. The dwell generator comprises analog-to-digital conversion means responsive to the current signal or the dwell signal for generating a digital word representing the dwell angle, counter means for receiving the digital word and the input frequency signal, the counter means producing a dwell pulse having a duration proportional to the value of the digital word, phase timing means responsive to the input frequency signal for providing an enable signal ensuring that only one of the phases is enabled at one time, and logic means for generating the firing pulses, the logic means being coupled to the counter means and the phase timing means.

The apparatus may further include frequency function means for generating a frequency error signal in response to the current signal, and junction means for adjusting the frequency of the input frequency signal.

DETAILED DESCRIPTION OF THE DRAWINGS

The novel features of the invention are set forth with particularity in the appended claims. The invention itself, however, both as to organization and method of operation, together with further objects and advantages thereof, may best be understood by reference to the following description taken in conjunction with the accompanying drawings in which:

FIG. 3 plots torque versus commutation angle $\theta_P$ for different values of dwell angle $\theta_D$ for a typical switched reluctance motor.

FIG. 4 plots efficiency versus commutation angle for different values of dwell angle for a typical switched reluctance motor.

Figure 5:
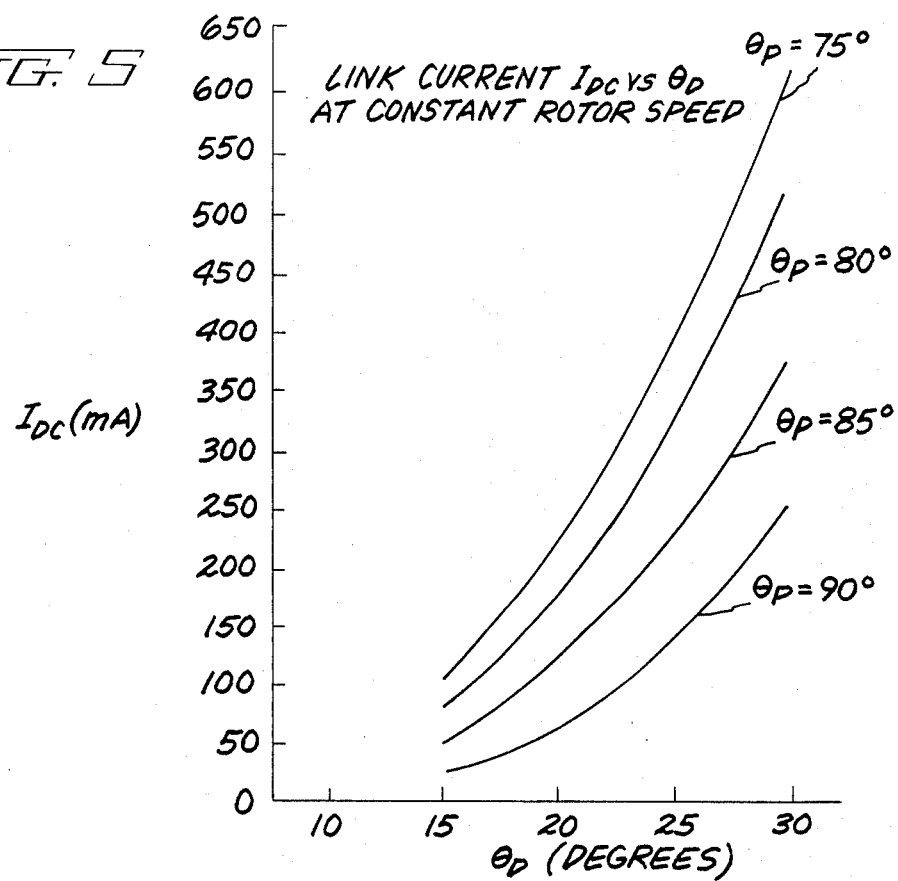

FIG. 5 plots average dc link current versus dwell angle for different values of commutation angle for a switched reluctance motor running without a shaft position sensor.

FIG. 6 is a functional block diagram showing apparatus for controlling the switched reluctance drive according to the method of the present invention.

FIG. 7 is a functional block diagram showing the dwell generator of FIG. 6 in greater detail.

Figure 8:
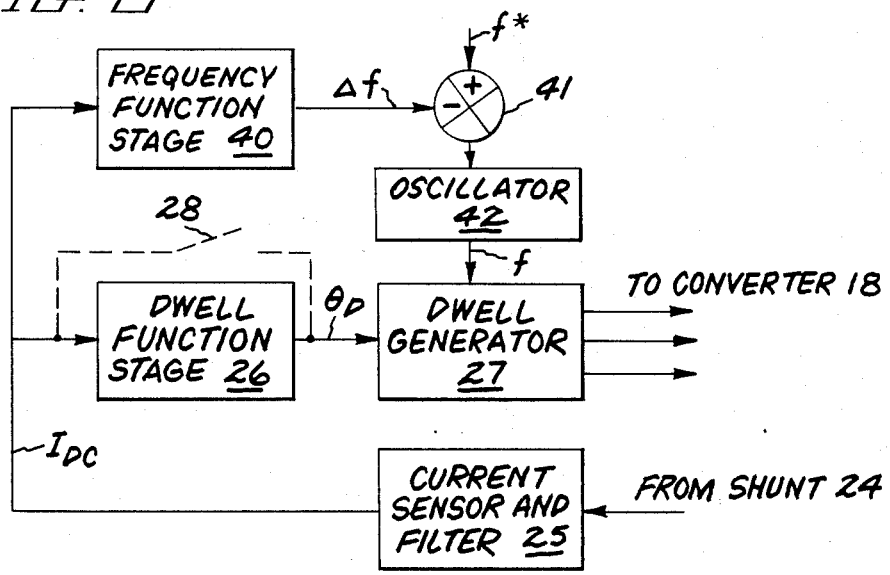

FIG. 8 is a functional block diagram showing additional apparatus for running the switched reluctance motor at constant load torque according to the method of the present invention.

Figure 9:
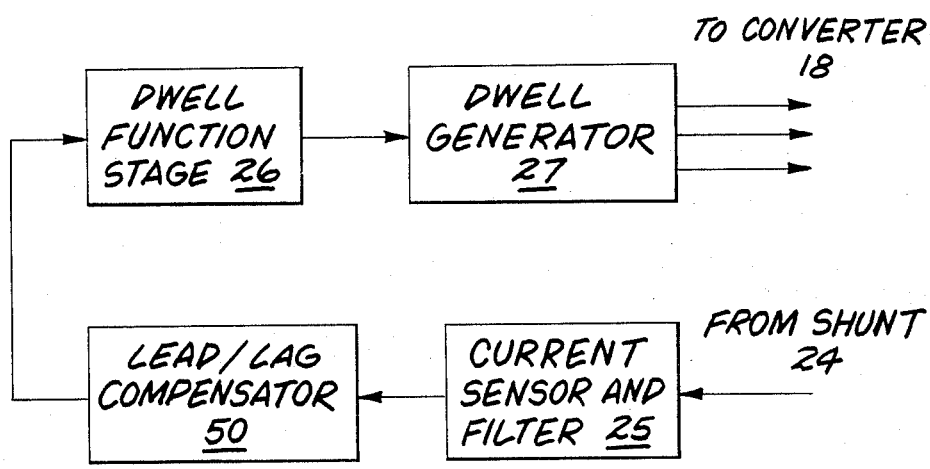

FIG. 9 is a functional block diagram showing a lead-/lag compensator to improve the damping of the drive system.

DETAILED DESCRIPTION OF THE INVENTION

Figure 1:
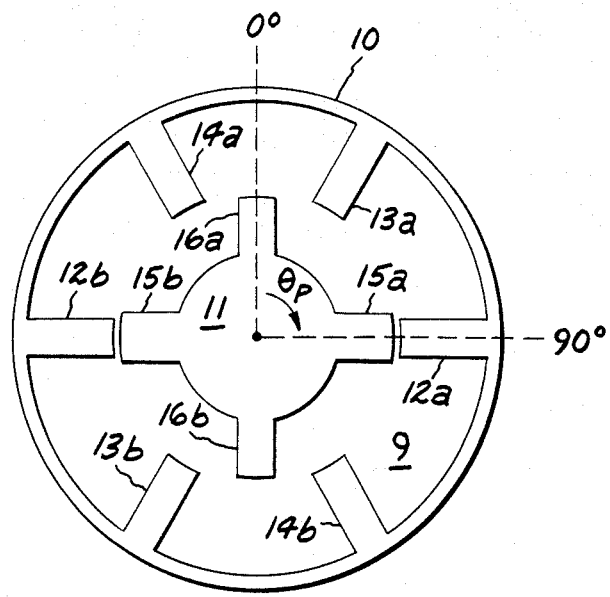
FIG. 1 is a cross-sectional view of the stator and rotor of a conventional switched reluctance motor.

A conventional switched reluctance motor, with windings removed, is shown in cross section in FIG. 1. A laminated iron stator 10 has a plurality of stator pole pairs, 12a and 12b, 13a and 13b, and 14a and 14b. A laminated iron rotor 11 has a plurality of pairs of rotor poles 15a and 15b, and 16a and 16b. Preferably, there is one less pair of rotor poles than pairs of stator poles.

Figure 2:
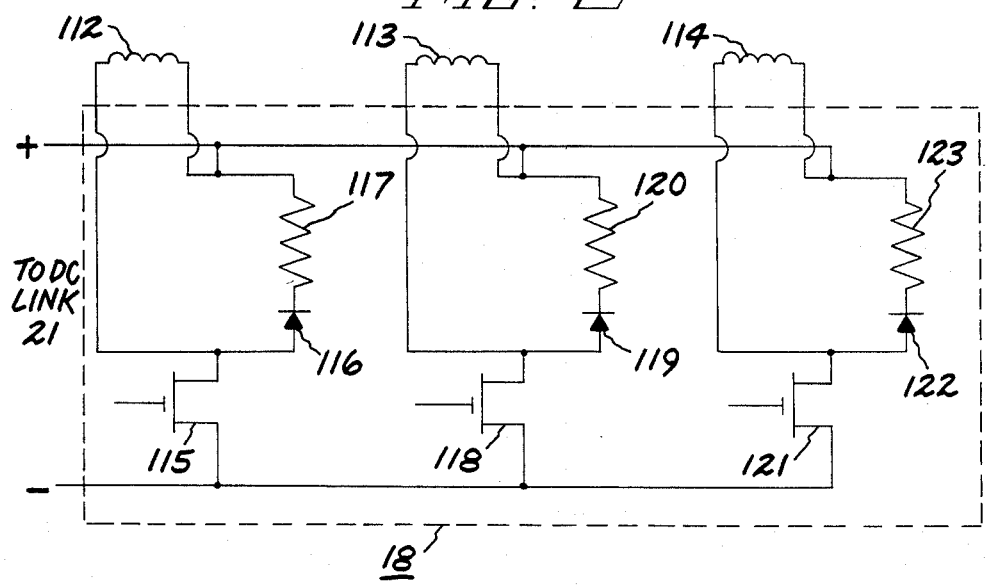
FIG. 2 is a schematic diagram of phase windings and a converter circuit for the switched reluctance motor of FIG. 1.

A winding (not shown) is wound on each of the stator poles, and the windings for the stator poles of each stator pole pair are connected in series to form a phase winding. Thus, the schematic diagram of FIG. 2 shows a phase winding 112 which is wound on stator poles 12a and 12b, phase winding 113 wound on stator poles 13a and 13b, and phase winding 114 wound on stator poles 14a and 14b. The phase windings are each connected to a separate leg of a converter circuit 18 which is supplied from a dc link 21, so as to provide phase currents to each of the phase windings. For example, when a field effect transistor (i.e. FET) 115, connected in series with phase winding 112 across DC link 21, is turned on, a phase current flows in phase winding 112. When FET 115 is turned off, residual magnetic energy in phase winding 112 is returned to dc link 21 through a series-connected diode 116 and resistor 117. The portions of converter circuit 18 connected to phase windings 113 and 114 behave identically to that described for phase winding 112 except that the energization of phase windings 113 and 114 by converter circuit 18 is phased by equal increments of rotor rotation.

The switching of phase winding 112 wound on stator poles 12a and 12b, shown in FIG. 1, will now be described with reference to the position of rotor pole pair 15a and 15b. As shown in FIG. 1, the angular position of rotor pole 15a with reference to stator pole 12a is measured from a position at right angles with stator pole 12a designated 0°. Thus, the position of rotor pole 15a shown in FIG. 1 corresponds to an angle $\theta = 90°$. The rotor position when phase current is switched on is designated $\theta_{on}$ and when phase current is switched off is designated $\theta_p$. Thus, the rotor rotation which occurs in the time interval between the switching on and switching off of the phase current, i.e. $\theta_{on}$ to $\theta_P$, is the dwell angle $\theta_D$. $\theta_P$ is also referred to as the commutation angle. By way of example, if $\theta_{ON} = 60°$ and $\theta_P = 90°$ (meaning that the phase current is switched off when the rotor pole pair 15a and 15b and stator pole pair 12a and 12b are exactly aligned), then $\theta_D$ would equal 30°.

Certain characteristics of the switched reluctance motor will now be described with reference to FIGS. 3-5. FIG. 3 plots the average torque of the motor shown in FIG. 1 as a function of $\theta_P$ and selected values of $\theta_D$ at a constant speed. The right side of the maximum torque point for each $\theta_D$ curve in FIG. 3 represents the stable operation of the motor, while the left side represents the unstable operation. FIG. 3 thus shows that for a given load torque there is a minimum $\theta_D$ required in order to operate the motor in a stable condition. Increasing $\theta_D$ above that minimum value results in a greater torque margin for stable operation (or "torque margin") and less chance that the motor will pull out and stall.

An undesirable effect of increasing $\theta_D$ in order to have a high torque margin for stable operation, however, is a decrease in efficiency $\eta$ of the motor. Thus, a tradeoff exists between torque margin and efficiency since using a narrow $\theta_D$ results in a low torque margin but a high efficiency.

FIG. 4 plots efficiency $\eta$ as a function of $\theta_P$ and selected values of $\theta_D$ at a constant speed, for the motor of FIG. 1. Thus it is seen that for a given dwell angle $\theta_D$, maximum efficiency of the motor under consideration occurs at a commutation angle $\theta_P$ of about 80°. The value of $\theta_P$ giving maximum efficiency is a function of the particular motor design and, furthermore, may not have the same value for all values of $\theta_D$ for some motors.

From the data shown in FIG. 4, it is apparent that in order to operate at maximum efficiency, the dwell angle $\theta_D$ should be as small as possible and the commutation angle $\theta_P$ should be as close as possible to 80° for the motor of the present example. However, operating at a small $\theta_D$ results in a low torque margin such that the switched reluctance motor may become unstable upon the occurrence of any small increase in the load applied to the motor.

In general, when operating a switched reluctance drive with a shaft position sensor, $\theta_D$ and $\theta_P$ are controlled as independent variables. As a result, the third independent variable, load torque T, fixes motor frequency f, the dependent variable. When operating the switched reluctance drive without a shaft position sensor, motor frequency f and $\theta_D$ are controlled, and load torque T fixes $\theta_P$. Average dc link current supplied to the converter is a further dependent variable which is substantially proportional to load torque and may be used as a measurement of load torque.

The present invention allows the dwell angle $\theta_D$ to be changed from any value in one commutation of the converter to any other value for the succeeding commutation of the converter in response to a torque disturbance which might cause the motor to stall. In other words, upon the detection of a torque disturbance, dwell angle $\theta_D$ can be immediately increased, providing an increase in pullout torque and stabilizing the motor operation for any value of instantaneous load torque within the capability of the motor.

FIG. 5 plots dc link current $I_{DC}$ as a function of $\theta_D$ and selected values of $\theta_P$ at a constant motor speed. Thus, with an increase in dc link current $I_{DC}$, $\theta_D$ must be increased in order to maintain a constant $\theta_P$. Therefore, in response to a given average dc link current $I_{DC}$, the switched reluctance drive may be operated at maximum efficiency by selecting $\theta_D$ such that $\theta_P$ is fixed at 80°, in the present example.

The value of $\theta_D$ determined by average dc link current $I_{DC}$ and the relationship defined by the curve in FIG. 5 corresponding to $\theta_P=80°$ is programmed into the converter control shown in FIG. 6. Switched reluctance drive 20, comprising motor 9 of FIG. 1, and phase windings 112-114 and converter circuit 18 as shown in FIG. 2, is supplied by dc link 21 comprising dc source 23 and dc link capacitor 22. An instantaneous current measurement is supplied to current sensor and filter 25 by means of a shunt resistor 24. Filter 25 can be a standard low-pass RC-type filter preferably using an operational amplifier in order to produce average dc link current signal $I_{DC}$. Current sensor and filter 25 may also include an instrument amplifier for amplifying the instantaneous current signal from shunt resistor 24. Alternatively, filter 25 may comprise a sampled-data filter that samples current at defined rotor positions. Current signal $I_{DC}$ is proportional to the load torque supplied by drive 20 and is used to control dwell angle $\theta_D$ of the phase currents.

A dwell function stage 26 receives $I_{DC}$ as an input signal and provides an analog voltage representing $\theta_D$ at its output. Dwell function stage 26 is a nonlinear amplifier which, in a preferred embodiment, exhibits a response curve which is the inverse of the curve corresponding to $\theta_P=80°$ in FIG. 5. Since this response curve is very nearly a straight line, it may be approximated by a straight line by removing dwell function stage 26, and replacing it with a conductor, as would be accomplished by closing a switch 28 across dwell function stage 26. A dwell generator 27 receives as input signals $\theta_D$ and f. Input frequency f is typically a 76.8 kilohertz square wave from a square wave generator (not shown) which remains substantially constant. The output of dwell generator 27 provides firing pulses to converter 18 for controlling each of the phases of switched reluctance drive 20.

In the presently considered embodiment of the invention, an input frequency f of 76.8 kilohertz is chosen because it may conveniently provide a 300 hertz signal (e.g. by dividing by 256) for operating the three phase motor of FIG. 1 at 1500 rpm (since each phase is energized twice for each rotor pole pair during a full rotation of the rotor). The same motor could also be operated at 750 rpm by dividing input frequency f by 512, yielding a 150 hertz fundamental frequency signal.

Dwell generator 27 is shown in greater detail in FIG. 7. An A/D converter 30 receives dwell signal $\theta_D$ and generates a digital word representing the correct dwell angle. The most significant bit MSB is always high at +5 volts so that the digital word has a minimum value representing a minimum dwell angle of 15° and a maximum value representing a maximum dwell angle of 30°. The digital word is loaded into counter 31 which counts down the digital word at a rate determined by f, e.g. 76.8 kilohertz. The output signal of counter 31 is high until it is counted down to zero. Thus, counter 31 produces a dwell pulse having a duration proportional to the value of the digital word which provides the desired dwell angle $\theta_D$. At the beginning of the next commutation of converter 18, counter 31 is reset by the fundamental frequency signal (described below) while the current value of the digital word is loaded into counter 31.

Input frequency f is also provided to a divider 32 in dwell generator 27. Divider 32 divides the input frequency f by 256 to obtain a 300 hertz fundamental frequency signal for operating switched reluctance drive 20 (FIG. 6). This 300 hertz signal is provided to counter 31 to reset counter 31 as described above. A phase timer 33 also receives the 300 hertz fundamental frequency signal from divider 32 and generates a phase enable signal for each motor phase such that only one phase will be on at any one time. Three enable signals from phase timer 33 are each ANDed with the dwell pulse from counter 31 in logic means comprising AND gates 34, 35 and 36. The outputs of AND gates 34, 35 and 36 are connected to the gates of FETs 115, 118 and 121, respectively, of converter circuit 18 shown in FIG. 2.

The apparatus shown in FIG. 7 and described above will provide firing pulses to the switching elements in converter circuit 18 which result in dwell angles of between 15° and 30°. This provides an acceptable operating range for switched reluctance drive 20.

In the above described embodiment, the dwell angle of the phase current is increased in response to a torque disturbance, insuring that sufficient torque margin is available to prevent switched reluctance drive 20 from pulling out or stalling. However, if there is a long term torque disturbance, the dwell angle $\theta_D$ may remain large, thereby reducing the efficiency of the drive. Therefore, it is desirable to correct the value of load torque where there is a long term change in load torque.

In accordance with the present invention, it is recognized that for most loads a reduction in speed results in a reduction in load torque. Therefore, in response to a long term increase in load torque, the speed of the drive may be reduced in order to maintain a substantially constant average load torque. This change in speed may be achieved by reducing the frequency at which the converter operates.

FIG. 8 is a block diagram showing alternative apparatus for operating the switched reluctance drive at a substantially constant average load torque. A frequency function stage 40 receives current signal $I_{DC}$ as an input and produces an error frequency signal $\Delta f$. Frequency function stage 40 is a nonlinear amplifier having a characteristic determined by the particular switched reluctance drive, whereby a long term increase in $I_{DC}$ results in an increase in $\Delta f$, and vice versa. $\Delta f$ and a commanded frequency f* are provided to a summing junction 41 as shown in FIG. 8. The output of summing junction 41 is supplied to a voltage controlled oscillator 42 which produces the input frequency signal f supplied to dwell generator 27. Thus, any tendency for load torque to increase results in an increase in $\Delta f$. This reduces the voltage supplied to oscillator 42 and reduces the value of f. When f is lowered, the motor runs at a slower speed keeping load torque substantially constant. By contrast, if load torque begins to decrease, f will be allowed to increase slightly to maintain load torque at the predetermined value.

The method and apparatus described above can also be used to improve the damping of the response of a variable reluctance motor when operated in stepping mode. In that case, a phase lead/lag compensator 50 would preferably be included in the control loop in series between current sensor and filter 25 and dwell function 26, as shown in FIG. 9. The damping to torque disturbances of the system described above (i.e. continuous rotation) may also be improved by including a phase lead/lag compensating circuit 50 between filter 25 and dwell function stage 26, as shown in FIG. 9.

The control circuit of the present invention as described above may be simplified, if desired. That is, since the optimum dwell function may be approximated by a straight line, it is also possible to remove dwell function stage 26, coupling $I_{DC}$ directly to dwell generator 27 with minimum and maximum values of the dwell angle corresponding to specific values of $I_{DC}$, such as would be approximated with a dwell function short-circuiting switch 28, shown dashed.

The foregoing demonstrates a new and improved method for controlling, at a high efficiency, a switched reluctance drive without a shaft position sensor. The method allows operation of a switched reluctance drive near its pullout torque at all normal values of instantaneous load torque. The dwell angle of firing pulses supplied to the converter circuit has a duration which fixes the commutation angle at the value which results in maximum efficiency of the drive.

While preferred embodiments of the present invention have been shown and described herein, it will be obvious to those skilled in the art that such embodiments are provided by way of example only. Numerous variations, changes, and substitutions will now occur to those skilled in the art without departing from the invention. Accordingly, it is intended that the invention be limited only by the spirit and scope of the appended claims.

What is claimed is:

1. An open loop method of controlling at least one phase in a converter-driven multiphase variable reluctance drive, said method comprising the steps of:
    measuring load torque; and
    setting the dwell angle of the phase current supplied by said converter to said one phase according to a relationship which increases said dwell angle in response to an increase in said measured load torque and which decreases said dwell angle in response to a decrease in said measured load torque, whereby said drive is operated near its pullout torque for all normal values of instantaneous load torque.

2. The method of claim 1 wherein said load torque is measured by sensing average DC link current supplied by said converter.

3. The method of claim 1 wherein said relationship yields the dwell angle corresponding to said measured load torque which fixes the commutation angle of said phase current at the value which provides maximum efficiency in said variable reluctance drive.

4. The method of claim 1 further including the step of changing the frequency of said converter in response to a change in said measured load torque whereby the average value of said measured load torque is maintained substantially at a predetermined value.

5. An apparatus for controlling a converter for supplying at least one phase of a variable reluctance drive, said converter being supplied from a DC link, said apparatus receiving an input frequency signal and comprising:
    current sensing and filtering means for providing a current signal proportional to the average current supplied by said DC link; and
    a dwell generator coupled to said current sensing and filtering means and responsive to said input frequency signal and said current signal, said dwell generator providing to said converter firing pulses having a dwell angle determined by said dwell generator in accordance with said current signal.

6. The apparatus of claim 5 wherein said dwell generator comprises:
    analog-to-digital conversion means responsive to said current signal for generating a digital word representing said dwell angle;
    counter means coupled to said analog-to-digital conversion means for receiving said digital word and being responsive to said input frequency signal, said counter means producing a dwell pulse having a duration proportional to the value of said digital word;
    phase timing means responsive to said input frequency signal for providing an enable signal for each of the phases of said drive, whereby only one of said phases is enabled at one time; and
    logic means coupled to said counter means and said phase timing means for generating said firing pulses.

7. The apparatus of claim 5 further comprising:
    frequency function means coupled to said current sensing and filtering means, said frequency function means being responsive to said current signal for generating a frequency error signal; and
    summing junction means for adjusting the frequency of said input frequency signal according to said frequency error signal, the output of said summing junction means being coupled to said dwell generator.

8. The apparatus of claim 5 further comprising a lead/lag compensator for coupling said current sensing and filtering means to said dwell generator.

9. An apparatus for controlling a converter for supplying at least one phase of a multi-phase variable reluctance drive, said converter being supplied from a DC link, said apparatus receiving an input frequency signal and comprising:
    current sensing and filtering means coupled to said DC link for providing a current signal proportional to the average current supplied by said DC link;
    dwell function means coupled to said current sensing and filtering means and having said current signal as an input, said dwell function means generating a dwell signal; and
    a dwell generator coupled to said dwell function means, said dwell generator being responsive to said input frequency signal and said dwell signal for providing firing pulses to said converter, said firing pulses having a dwell angle proportional to the magnitude of said dwell signal.

10. The apparatus of claim 9 wherein said dwell signal generated by said dwell function means is determined in accordance with said current signal, whereby the commutation angle of said phase current is fixed at the value which provides maximum efficiency in said drive.

11. The apparatus of claim 9 wherein said dwell generator comprises:

analog-to-digital conversion means responsive to said dwell signal for generating a digital word representing said dwell angle;

counter means coupled to said analog-to-digital conversion means for receiving said digital word and being responsive to said input frequency signal, said counter means producing a dwell pulse having a duration proportional to the value of said digital word;

phase timing means responsive to said input frequency signal for providing an enable signal for each of the phases of said drive, whereby only one of said phases is enabled at one time; and logic means coupled to said counter means and said phase timing means for generating said firing pulses.

12. The apparatus of claim 9 further comprising:

frequency function means coupled to said current sensing and filtering means, said frequency function means being responsive to said current signal for generating a frequency error signal; and summing junction means for adjusting the frequency of said input frequency signal according to said frequency error signal, the output of said summing junction means being coupled to said dwell generator.

13. The apparatus of claim 9 further comprising a lead/lag compensator for coupling said current sensing and filtering means to said dwell function means.

* * * * *